US009370037B2

(12) United States Patent
Avula et al.

(10) Patent No.: US 9,370,037 B2
(45) Date of Patent: Jun. 14, 2016

(54) INTELLIGENT POLICY AND CHARGING RULE FUNCTION (PCRF) RESTORATION

(71) Applicants: Verizon Patent and Licensing Inc., Basking Ridge, NJ (US); Cellco Partnership, Basking Ridge, NJ (US)

(72) Inventors: Niranjan B. Avula, Frisco, TX (US); Imtiyaz Shaikh, Irving, TX (US); Priscilla Lau, Fremont, CA (US); Ho Yin Cheuk, Bridgewater, NJ (US); Robert M. Ephraim, Bridgewater, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 237 days.

(21) Appl. No.: 13/974,499

(22) Filed: Aug. 23, 2013

(65) Prior Publication Data

US 2015/0055446 A1 Feb. 26, 2015

(51) Int. Cl.
*H04W 76/02* (2009.01)
*H04W 56/00* (2009.01)

(52) U.S. Cl.
CPC .......... *H04W 76/028* (2013.01); *H04W 56/002* (2013.01)

(58) Field of Classification Search
None
See application file for complete search history.

(56) References Cited

U.S. PATENT DOCUMENTS

| 2007/0211694 A1* | 9/2007 | Rasanen | H04L 45/00 370/352 |
| 2012/0072585 A1* | 3/2012 | Yang et al. | 709/224 |
| 2012/0096177 A1* | 4/2012 | Rasanen | 709/228 |

\* cited by examiner

*Primary Examiner* — Awet Haile

(57) ABSTRACT

A first device associated with an evolved packet core network receives a first update request from a second device associated with the evolved packet core network. The first update request is associated with a communication session previously provided between the first device and the second device, and the first update request is generated based on a voice/video request. The first device generates an update answer in response to the first update request, where the update answer includes a code requesting that the communication session be restored between the first device and the second device. The first device receives, based on the code, a second update request from the second device, where the second update request includes session information associated with the communication session. The first device restores, based on the session information, the communication session between the first device and the second device to create a restored communication session.

20 Claims, 14 Drawing Sheets

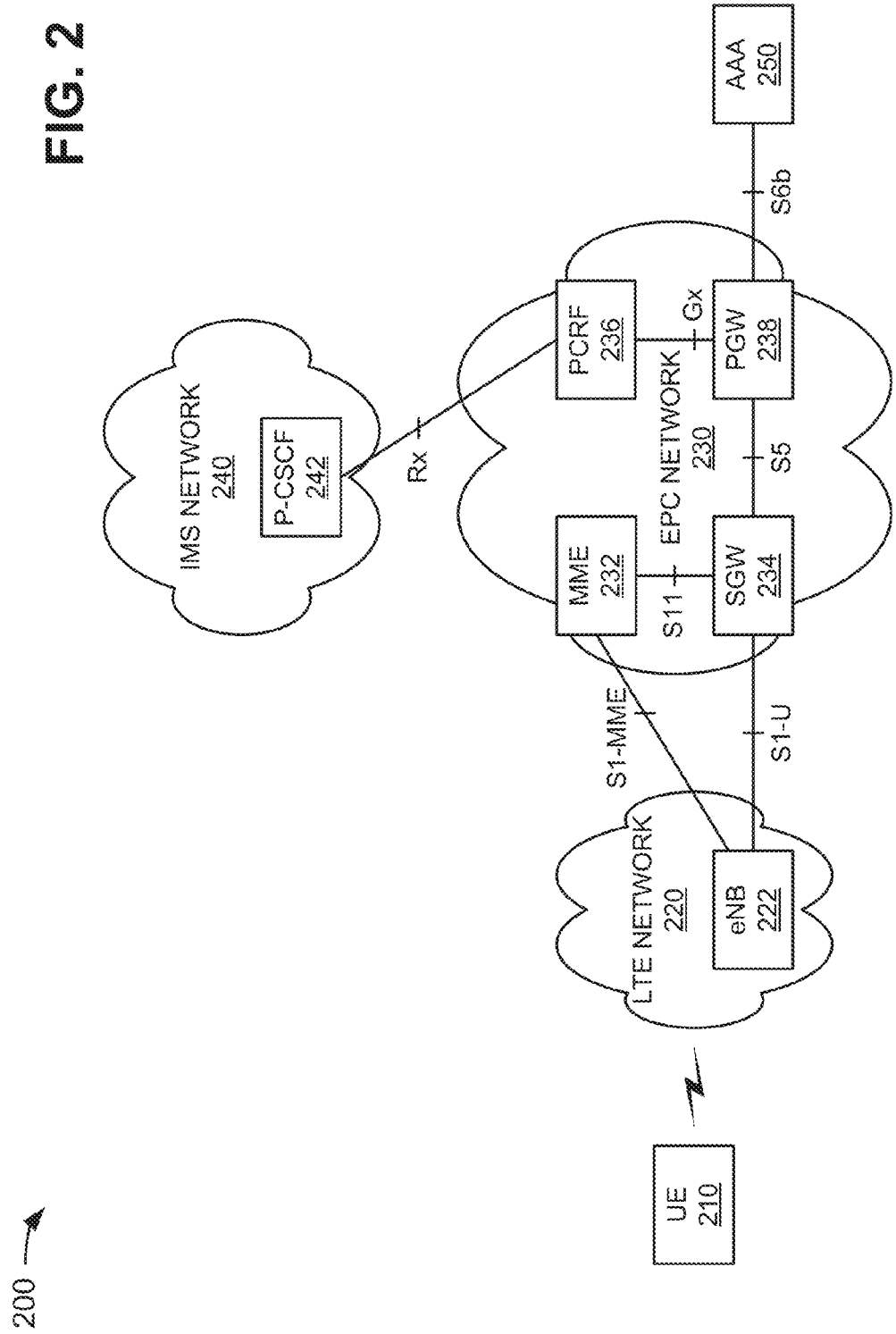

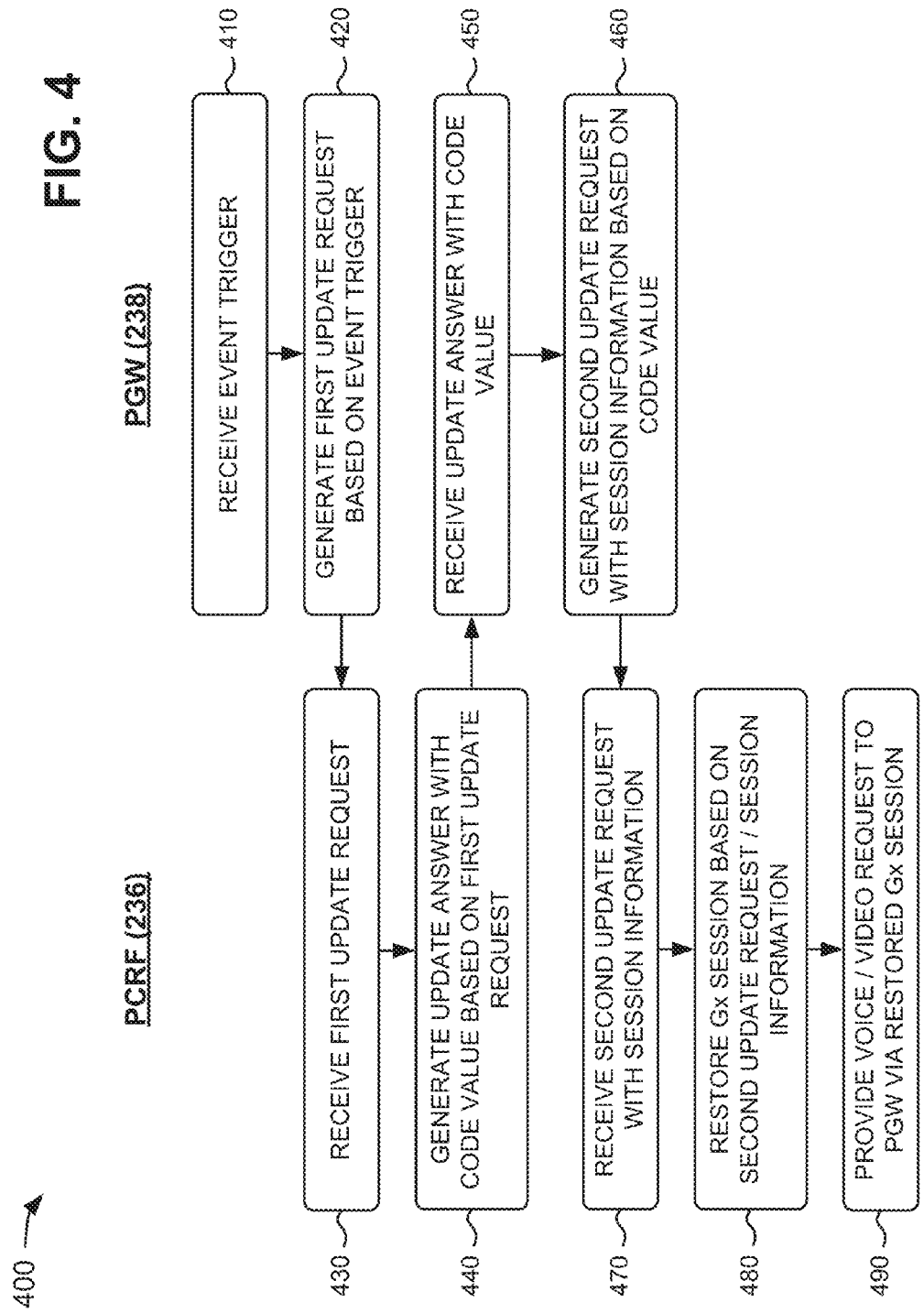

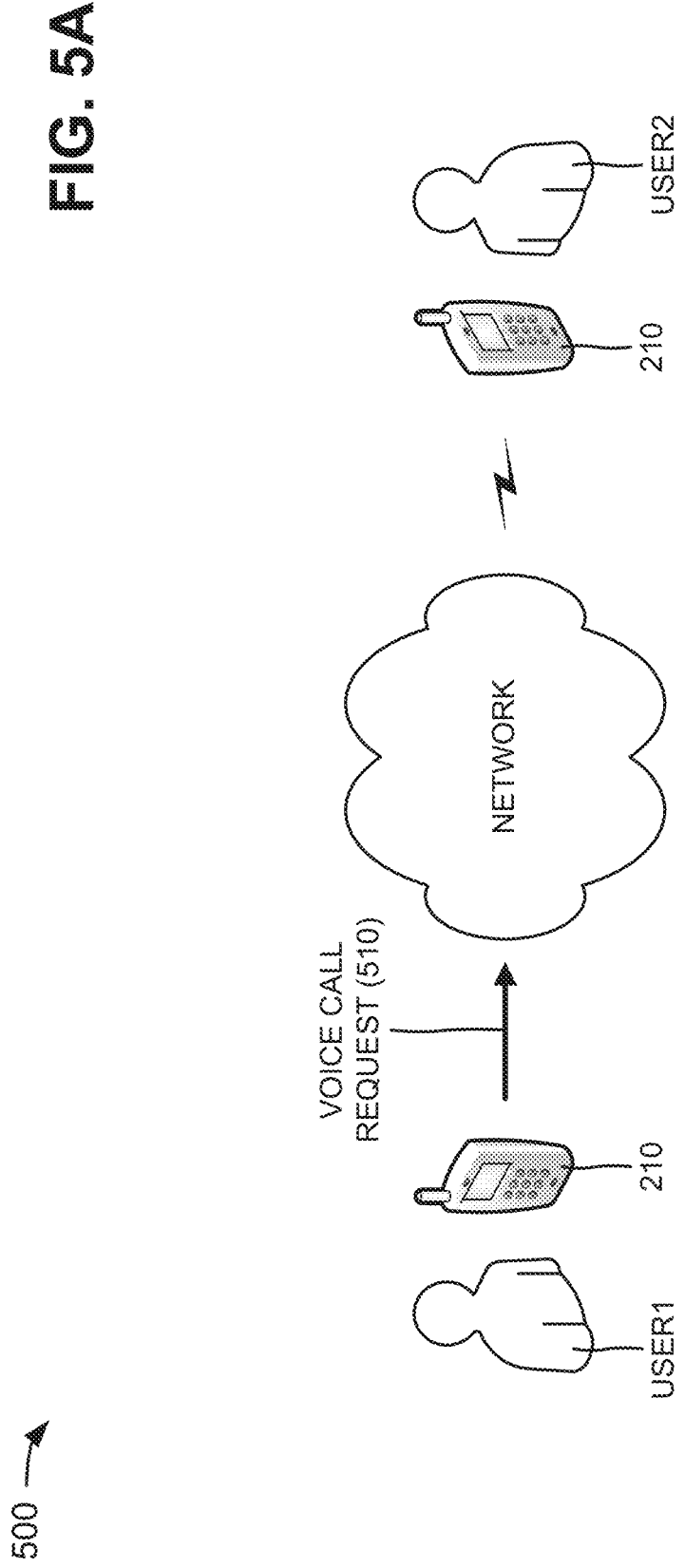

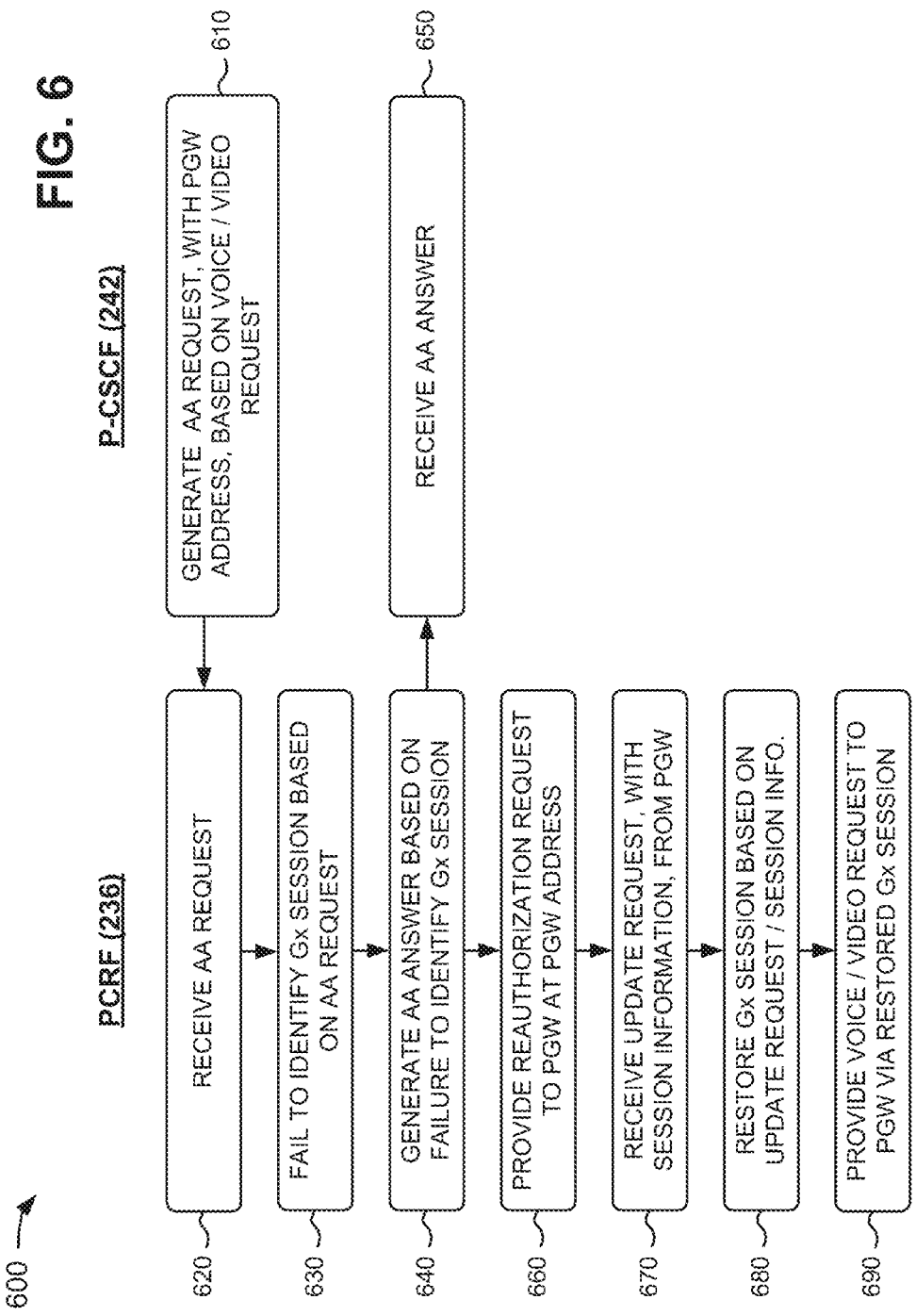

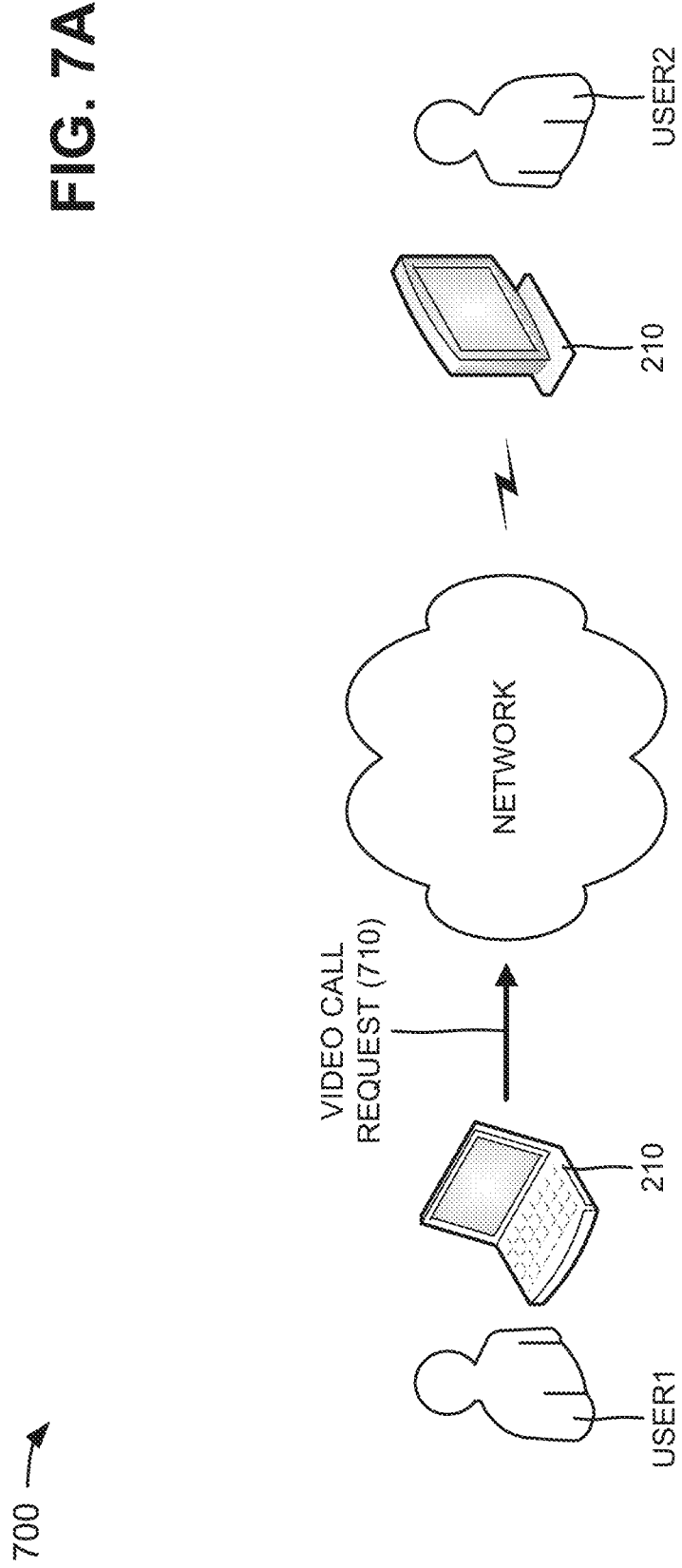

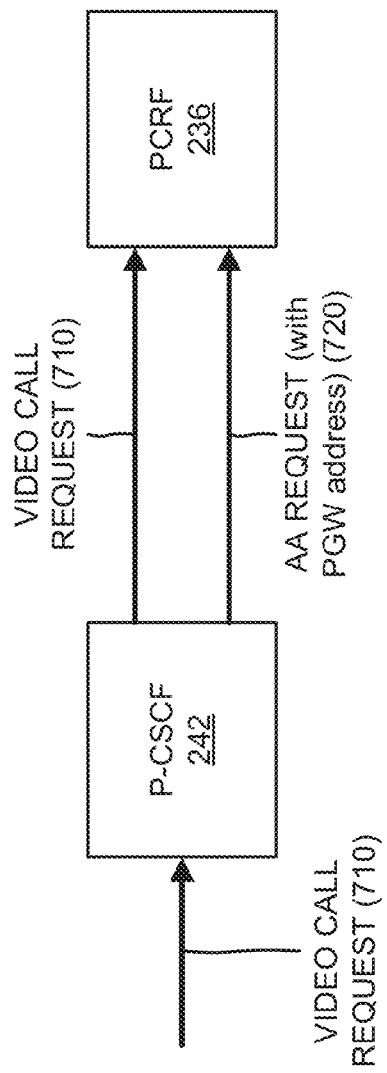

INTELLIGENT POLICY AND CHARGING RULE FUNCTION (PCRF) RESTORATION

BACKGROUND

In the Third Generation Partnership Project (3GPP), the fourth generation (4G) cellular network includes a radio access network (e.g., referred to as a long term evolution (LTE) network) and a wireless core network (e.g., referred to as evolved packet core (EPC) network). The LTE network is often called an evolved universal terrestrial radio access network (E-UTRAN). The EPC network is an Internet protocol (IP) packet-switched core network that supports high-speed wireless and wireline broadband access technologies. The EPC network allows user equipment (UEs) to access various services by connecting to the LTE network, an evolved high rate packet data (eHRPD) radio access network (RAN), and/or a wireless local area network (WLAN) RAN. The EPC network is a complex system that includes a number of network nodes that communicate with each other when UEs are accessing the EPC network. An evolved packet system (EPS) is defined to include both the LTE and EPC networks. EPS seeks to improve mobile technology through higher bandwidth, better spectrum efficiency, wider coverage, enhanced security, and full interworking with other access networks.

In the EPC, a policy and charging rule function (PCRF) manages Gx sessions between a packet data network (PDN) gateway (PGW) and the PCRF, and manages Rx sessions between a proxy call session control function (P-CSCF) (e.g., of an IP Multimedia Subsystem (IMS) network) and the PCRF. Gx sessions typically tend to be long-lived sessions. However, the PCRF may experience a Gx session loss due to, for example, software failure, geo-redundancy recovery, etc. associated with the PCRF. The PCRF may also experience a message loss, such as, for example, a reauthorization request being dropped due to overload control, message buffer overflow, etc. During the session loss and/or the message loss, the PCRF and the PGW are unable to synchronize session state (e.g., policy control and charging rules status, quality of service (QoS), event triggers, access point name (APN)-aggregate maximum bit rate (AMBR), etc.). This, in turn, results in a poor user experience when a user is attempting to establish voice and/or video calls. For example, the PCRF cannot process an Rx request for a voice/video call when the PCRF has lost state for a corresponding Gx session. This may require the user to power cycle the UE or to drop and recreate a PDN connection and a Gx connection to establish the voice/video call.

BRIEF DESCRIPTION OF THE DRAWINGS

FIG. 2 is a diagram of an example environment in which systems and/or methods described herein may be implemented;

FIG. 4 is a flow chart of an example process for reestablishing a communication session provided between a PCRF and a PGW;

FIGS. 5A-5D are diagrams of an example relating to the example process shown in FIG. 4;

FIG. 6 is a flow chart of an example process for providing an Rx-triggered recovery of a communication session provided between a PCRF and a PGW; and FIGS. 7A-7D are diagrams of an example relating to the example process shown in FIG. 6.

DETAILED DESCRIPTION OF PREFERRED EMBODIMENTS

The following detailed description refers to the accompanying drawings. The same reference numbers in different drawings may identify the same or similar elements.

Figure 1A:
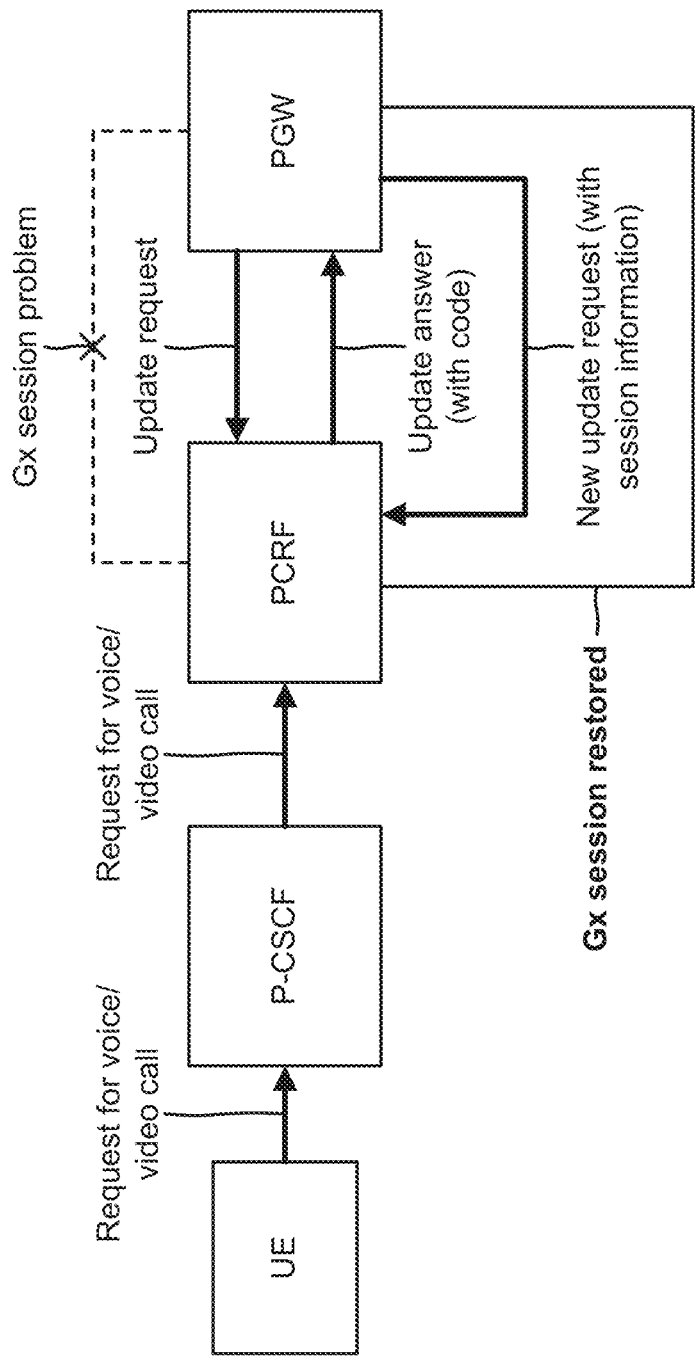
FIGS. 1A and 1B are diagrams of an overview of an example implementation described herein.
Figure 1B:
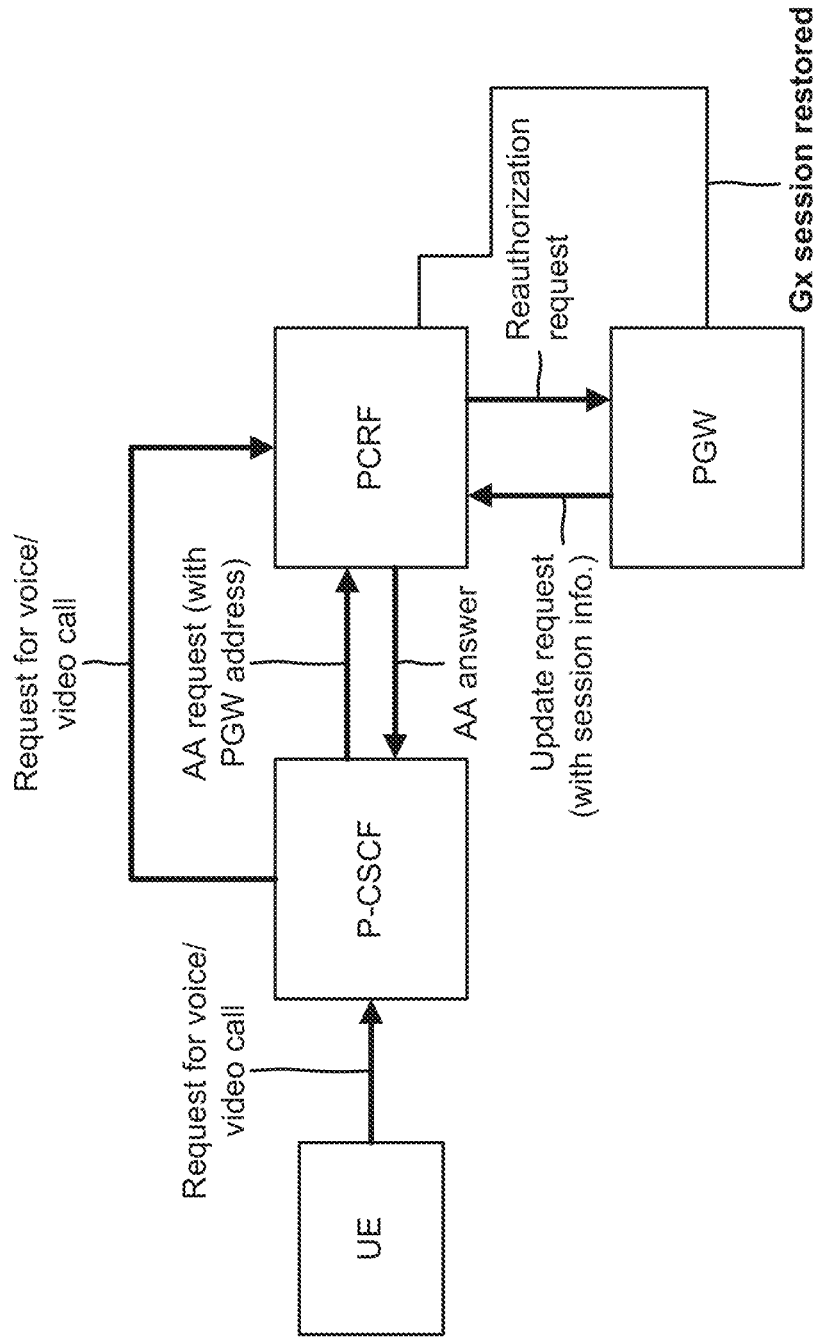

FIGS. 1A and 1B are diagrams of an overview of an example implementation 100 described herein. With reference to FIG. 1A, an EPC network (not shown in FIG. 1A) may include a PCRF and a PGW, and a UE may connect to the EPC network (e.g., via an LTE network, not shown in FIG. 1A). The EPC network may include a core network architecture of the 3GPP LTE wireless communication standard. The LTE network may include a communications network that connects subscribers (e.g., the UE) to a service provider. The UE may include a radiotelephone, a personal communications system (PCS) terminal, a smart phone, a personal digital assistant (PDA), a laptop computer, a tablet computer, etc.

The PCRF may provide policy control decision and flow based charging control functionalities. The PGW may provide connectivity of the UE to external packet data networks by being a traffic exit/entry point for the UE. The PCRF may connect to a P-CSCF (e.g., of an IMS network, not shown in FIG. 1A). The P-CSCF may protect the EPC network and the IMS network, and may function as a proxy server for the UE 210. The IMS network may include an architectural framework or network for delivering IP multimedia services.

The UE may attempt to establish a voice or video (voice/video) call with one or more other UEs via the EPC network. When establishing the voice/video call, the UE may generate a request for the voice/video call, as further shown in FIG. 1A. The request for the voice/video call may eventually be received by the P-CSCF and provided to the PCRF. Assume that the PCRF initially successfully establishes a communication session (e.g., a Gx session) with the PGW. However, further assume that the PCRF loses the communication session with the PGW due to an error condition or other problem associated with the Gx session, as shown in FIG. 1A.

An event trigger for the communication session may be generated (e.g., based on a radio access network change, out of credit condition, etc.), and may be provided to the PGW. The PGW may provide a communication session update request (e.g., for the communication session) to the PCRF in response to the event trigger, as shown in FIG. 1A. In typical arrangements, the PCRF may respond to the update request with an error message (e.g., a Diameter error unknown session ID message), which may provide the undesirable results of dropping the communication session or applying local policy rules. In some implementations, when the PCRF receives the update request from the PGW, the PCRF may generate a communication session update answer that includes a code (e.g., a Diameter session recovery request). The PCRF may provide the update answer (e.g., with the code) to the PGW, as further shown in FIG. 1A.

The PGW may receive the update answer and the code, and may generate a new communication update request based on the code. The new update request may include communication session information (e.g., policy control and charging rules, rule status, APN-AMBR, QoS, event triggers, binding information, etc.). The PGW may provide the new update request to the PCRF, as shown in FIG. 1A. The PCRF may utilize the session information to restore the communication session provided between the PCRF and the PGW, as further shown in FIG. 1A. Once the communication session is restored, the PCRF may provide the request for the voice/video call to the PGW.

With reference to FIG. 1B, the UE may attempt to establish a voice/video call with one or more other UEs via the EPC network. When establishing the voice/video call, the UE may generate a request for the voice/video call, as further shown in FIG. 1B. The request for the voice/video call may eventually be received by the P-CSCF and provided to the PCRF. The P-CSCF may generate an authentication/authorization (AA) request based on the voice/video call, and may provide an address of the PGW in the AA request. The P-CSCF may provide the AA request (e.g., with the PGW address) to the PCRF, as shown in FIG. 1B.

The PCRF may receive the AA request, and may attempt to identify a communication session (e.g., a Gx session) with the PGW based on the AA request and the UE's IP address included in the AA request. In typical arrangements, if the PCRF fails to identify the communication session with the PGW, the PCRF may return an error message (e.g., a Diameter error session not found message), which may provide the undesirable results of dropping the communication session.

In some implementations, if the PCRF fails to identify the communication session with the PGW, the PCRF may respond to the P-CSCF with an AA answer, and may attempt to restore the communication session with the PGW. The PCRF may establish a restoration communication session with the PGW (e.g., based on the PGW address), and may provide a reauthorization request to the PGW, as further shown in FIG. 1B. The reauthorization request may include information (e.g., an IP address of the UE, a mobile subscriber integrated services digital network (MSISDN) of the UE, etc.) provided in the AA request.

The PGW may receive the reauthorization request, and may generate a communication update request based on the reauthorization request. The update request may include communication session information (e.g., charging rules, rule status, APN-AMBR, QoS, event triggers, binding information, etc.). The PGW may provide the update request to the PCRF, as shown in FIG. 1B. The PCRF may utilize the session information to restore the communication session provided between the PCRF and the PGW, as further shown in FIG. 1B. Once the communication session is restored, the PCRF may provide the request for the voice/video call to the PGW. To facilitate the reauthorization request in restoring Gx communication session information, a Gx session may be established with the PCRF solely for the purpose of session restoration at a prior time (e.g., at startup of the PGW).

Such an arrangement may enable a PCRF to intelligently restore a lost communication session with a PGW. For example, the PCRF may restore the lost communication session based on interactions with the PGW and/or based on interactions with a P-CSCF and the PGW. This may prevent the PCRF and the PGW from dropping the communication session, which may prevent a video or voice call from being dropped.

FIG. 2 is a diagram of an example environment 200 in which systems and/or methods described herein may be implemented. As illustrated, environment 200 may include a UE 210, a LTE network 220, an EPC network 230, an IMS network 240, and an authentication, authorization, accounting (AAA) server 250. LTE network 220 may include an eNB 222. EPC network 230 may include a MME 232, a SGW 234, a PCRF 236, and a PGW 238. IMS network 240 may include a P-CSCF 242. Devices/networks of environment 200 may interconnect via wired and/or wireless connections.

As further shown in FIG. 2, eNB 222 may interface with MME 232 over a S1-MME interface, and may interface with SGW 234 over a S1-U interface. MME 232 may interface with SGW 234 over a S11 interface. SGW 234 may interface with PGW 238 over a S5 interface. PCRF 236 may interface with PGW 238 over a Gx interface. PCRF 236 may interface with P-CSCF 242 over an Rx interface. PGW 238 may interface with AAA server 250 over a S6b interface. Other interfaces not shown in FIG. 2 may also be utilized by devices of LTE network 220, EPC network 230, and/or IMS network 240. For example, multiple MMEs 232 may interface with one another over S10 interfaces.

UE 210 may include a radiotelephone; a PCS terminal that may combine, for example, a cellular radiotelephone with data processing and data communications capabilities; a smart phone; a PDA that can include a radiotelephone, a pager, Internet/intranet access, etc.; a laptop computer; a tablet computer; a desktop computer, a workstation computer; a personal computer; a landline telephone; or other types of computation and communication devices. In an example implementation, UE 210 may include a device that is capable of communicating over LTE network 220, EPC network 230, and/or IMS network 240.

LTE network 220 may include a communications network that connects subscribers (e.g., UE 210) to a service provider. In one example, LTE network 220 may include a wireless local area network (WLAN) or other access networks (e.g., an E-UTRAN or an enhanced high-rate packet data (eHRPD) network). Alternatively, or additionally, LTE network 220 may include a radio access network capable of supporting high data rate, low latency, packet optimization, large capacity and coverage, etc.

eNB 222 may include one or more computation and communication devices, such as a base station, that receive traffic from MME 232 and/or SGW 234 and transmit that traffic to UE 210. eNB 222 may also include one or more devices that receive traffic from UE 210 and transmit that traffic to MME 232 and/or SGW 234 or to other UEs 210. eNB 222 may combine the functionalities of a base station and a radio network controller (RNC) in 2G or 3G radio access networks.

EPC network 230 may include a core network architecture of the 3GPP LTE wireless communication standard. In one example, EPC network 230 may include an IP packet-switched core network that supports high-speed wireless and wireline broadband access technologies. In another example, EPC network 230 may provide packet-switched voice services (e.g., which are traditionally circuit-switched) using IMS network 240.

MME 232 may include one or more computation and communication devices that may be responsible for idle mode tracking and paging procedures (e.g., including retransmissions) for UE 210. MME 232 may be involved in a bearer activation/deactivation process (e.g., for UE 210) and may choose a SGW for UE 210 at an initial attach and at a time of intra-LTE handover. MME 232 may authenticate UE 210. Non-access stratum (NAS) signaling may terminate at MME 232 and MME 232 may generate and allocate temporary identities to UEs (e.g., UE 210). MME 232 may check authorization of UE 210 to utilize a service provider's Public Land Mobile Network (PLMN) and may enforce roaming restrictions for UE 210. MME 232 may be a termination point in EPC network 230 for ciphering/integrity protection for NAS signaling and may handle security key management. MME 232 may provide a control plane function for mobility between LTE and access networks with a S3 interface terminating at MME 232.

SGW 234 may include one or more traffic transfer devices (or network devices), such as a gateway, a router, a switch, a firewall, a network interface card (NIC), a hub, a bridge, a proxy server, an optical add-drop multiplexer (OADM), or some other type of device that processes and/or transfers traffic. In one example implementation. SGW 234 may route and forward user data packets, may act as a mobility anchor for a user plane during inter-eNB handovers, and may act as an anchor for mobility between LTE and other 3GPP technologies. For idle state UEs 210, SGW 234 may terminate a downlink data path and may trigger paging when downlink data arrives for UE 210. SGW 234 may manage and store contexts associated with UE 210 (e.g., parameters of an IP bearer service, network internal routing information, etc.).

PCRF 236 may include one or more computation and communication devices that may provide policy control decision and flow based charging control functionalities. PCRF 236 may provide network control regarding service data flow detection, gating, quality of service (QoS) and flow based charging, etc. PCRF 236 may determine how a certain service data flow shall be treated, and may ensure that user plane traffic mapping and treatment is in accordance with a user's subscription profile.

PGW 238 may include one or more traffic transfer devices (or network devices), such as a gateway, a router, a switch, a firewall, a NIC, a hub, a bridge, a proxy server, an OADM, or some other type of device that processes and/or transfers traffic. In one example implementation, PGW 238 may provide connectivity of UE 210 to external packet data networks by being a traffic exit/entry point for UE 210. UE 210 may simultaneously connect to more than one PGW for accessing multiple PDNs. PGW 238 may perform policy enforcement, packet filtering for each user, charging support, lawful intercept, and packet screening. PGW 238 may also act as an anchor for mobility between 3GPP and non-3GPP technologies.

IMS network 240 may include an architectural framework or network (e.g., a telecommunications network) for delivering IP multimedia services.

P-CSCF 242 may include one or more computation and communication devices that protect EPC network 230 and IMS network 240. In some implementations, P-CSCF 242 may function as a proxy server for UE 210, where session initiation protocol (SIP) signaling traffic to and from UE 210 may go through P-CSCF 242. P-CSCF 242 may validate and then forward requests from UE 210, and may process and forward responses to UE 210.

AAA server 250 may include one or more computation and communication devices that provide authentication, authorization, and accounting services for UE 210. With regard to authentication, AAA server 250 may verify an identifier (e.g., a mobile directory number (MDN), a mobile identification number (MIN), a mobile equipment identity (MEID), an IMEI, etc.) and credentials (e.g., passwords, tokens, digital certificates, etc.) associated with UE 210. With regard to authorization, AAA server 250 may grant or refuse privileges to UE 210 for accessing specific services. With regard to accounting, AAA server 250 may track consumption of network resources by UE 210.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
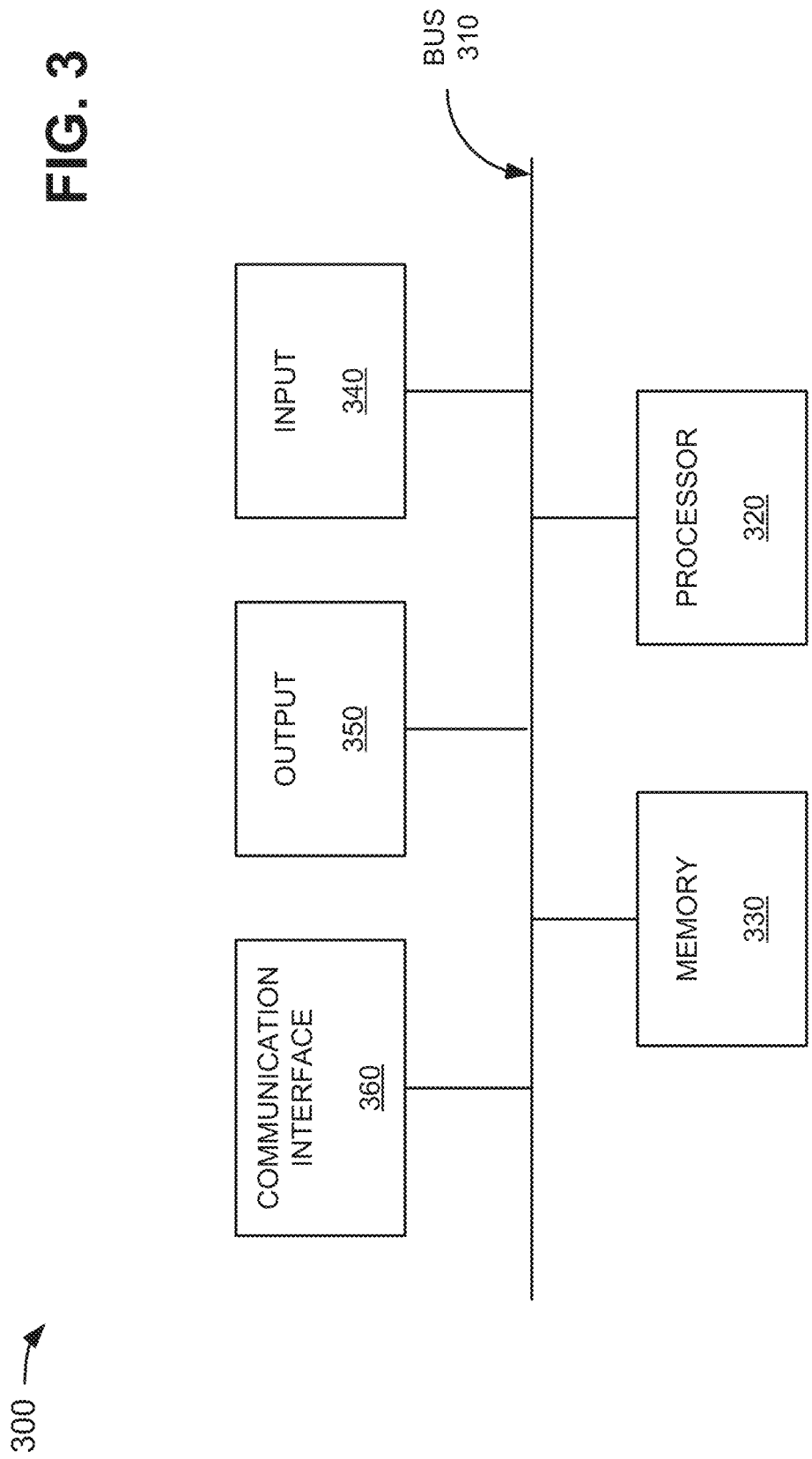
FIG. 3 is a diagram of example components of a device that may correspond to one or more of the devices of the environment depicted in FIG. 2.

FIG. 3 is a diagram of example components of a device 300 that may correspond to one or more of the devices of environment 200. In some implementation, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for reestablishing a communication session provided between a PCRF and a PGW. In some implementations, one or more process blocks of FIG. 4 may be performed by PCRF 236 and/or PGW 238. In some implementations, one or more process blocks of FIG. 4 may be performed by another device or a group of devices separate from or including PCRF 236 and/or PGW 238.

As shown in FIG. 4, process 400 may include receiving an event trigger (block 410). For example, UE 210 may attempt to establish a voice or video (voice/video) call with one or more other UEs via EPC network 230. When establishing the voice/video call, UE 210 may generate a request for the voice/video call and may provide the request for the voice/video call to P-CSCF 242. P-CSCF 242 may provide the request for the voice/video call to PCRF 236. In some implementations, a communication session (e.g., a Gx session) may be established between PCRF 236 and PGW 238 prior to receipt of an event trigger for the communication session. In some implementations, the event trigger may be generated (e.g., based on a radio access network change, out of credit condition, etc.), and may be received by PGW 238. The event trigger may include, for example, an application start trigger, a QoS requirements trigger, a user location trigger, etc.

As further shown in FIG. 4, process 400 may include generating a first update request based on the event trigger (block 420). For example, PGW 238 may generate a communication session update request when the event trigger is received by PGW 238. In some implementations, the update request may include a current control request update (CCR-U) message that requests a status of the communication session provided between PCRF 236 and PGW 238. In some implementations, PGW 238 may provide the update request to PCRF 236.

As further shown in FIG. 4, process 400 may include receiving the first update request (block 430). For example, PCRF 236 may receive the communication session update request from PGW 238. In some implementations, PCRF 236 may attempt to identify the communication session provided between PCRF 236 and PGW 238 based on the update request. For example, PCRF 236 may maintain or have access to a data structure (e.g., a table) that includes PGW addresses and identifiers for communication sessions associated with corresponding PGW addresses. PCRF 236 may compare the address of PGW 238 to the PGW addresses and the session identifiers contained in the data structure in order to identify a communication session associated with PGW 238. In some implementations, if the address of PGW 238 matches one of the PGW addresses and the communication session identifier matches a stored session identifier, PCRF 236 may identify the communication session associated with PGW 238. In some implementations, if the address of PGW 238 does not match one of the PGW addresses or if the session identifiers do not match, PCRF 236 may fail to identify the communication session associated with PGW 238. In some implementations, PCRF 236 may be unable to identify the communication session with PGW 238 due to an error condition or other problem (e.g., a software failure, geo-redundancy recovery, etc. associated with PCRF 236).

As further shown in FIG. 4, process 400 may include generating an update answer with a code value based on the first update request (block 440). For example, if PCRF 236 is unable to identify the communication session with PGW 238, PCRF 236 may generate a communication session update answer in response to the communication session update request. In some implementations, the update answer may include a current control answer update (CCA-U) message that provides a status of the communication session provided between PCRF 236 and PGW 238. In some implementations, PCRF 236 may provide, in the update answer, a code value indicating that PCRF 236 wishes to recover the communication session. For example, the code value may include a code (e.g., a Diameter session recover request code) that requests recovery of the communication session. In some implementations, PCRF 236 may provide the update answer, with the code value, to PGW 238. In some implementations, PCRF 236 and PGW 238 may exchange the update request and the update answer utilizing protocol messages, such as a Supported-Features attribute-value pair (AVP). The Supported-Features AVP may enable an origin host to inform a destination host about features supported by the origin host.

As further shown in FIG. 4, process 400 may include receiving the update answer with the code value (block 450). For example, PGW 238 may receive the communication session update answer, with the code value, from PCRF 236. In some implementations, PGW 238 may determine that PCRF 236 wishes to restore the communication session based on the code value. Based on this determination, PGW 238 may identify available session information associated with the communication session provided between PCRF 236 and PGW 238. In some implementations, the session information may include an entire charging rule, a rule status, an APN-AMBR, a QoS, event triggers, binding information (e.g., a table of IP addresses), etc. associated with the communication session.

As further shown in FIG. 4, process 400 may include generating a second update request, with session information, based on the code value (block 460). For example, PGW 238 may generate a new communication session update request when the code value is received by PGW 238. In some implementations, PGW 238 may provide the identified available session information (e.g., the entire policy control and charging rule, the rule status, the APN-AMBR, the QoS, the event triggers, binding information, etc.) in the new update request. In some implementations, PGW 238 may provide the new update request, with the session information, to PCRF 236.

As further shown in FIG. 4, process 400 may include receiving the second update request with the session information (block 470). For example, PCRF 236 may receive the new communication session update request, with the session information, from PGW 238. In some implementations, PCRF 236 may store the session information in a memory component associated with PCRF 236.

As further shown in FIG. 4, process 400 may include restoring a Gx communication session based on the second update request and the session information (block 480). For example, PCRF 236 may restore the communication session (e.g., the Gx session) between PCRF 236 and PGW 238 based on the new communication update request and the session information. In some implementations, PCRF 236 may restore the communication session by utilizing the binding information to locate the communication session and to reestablish the communication with PGW 238. In some implementations, PCRF 236 may maintain a timer for the communication session restoration. In such implementations, if the communication session is not restored before the timer expires, PCRF 236 may generate an error message (e.g., a resource allocation failure message), which may result in a failure of the voice/video call. However, even if the voice/video call fails due to the timer expiration, a subsequent voice/video call may be successful since the communication session restoration may continue and may be successful prior to the subsequent voice/video call.

As further shown in FIG. 4, process 400 may include providing the voice/video request to the PGW via the restored Gx communication session (block 490). For example, if PCRF 236 successfully restores the communication session with PGW 238 (e.g., prior to the timer expiration), PCRF 236 may provide the request for the voice/video call to PGW 238 via the restored communication session. In some implementations, PGW 238 may receive the request for the voice/video call, and may process the voice/video call per typical call-flow procedures.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
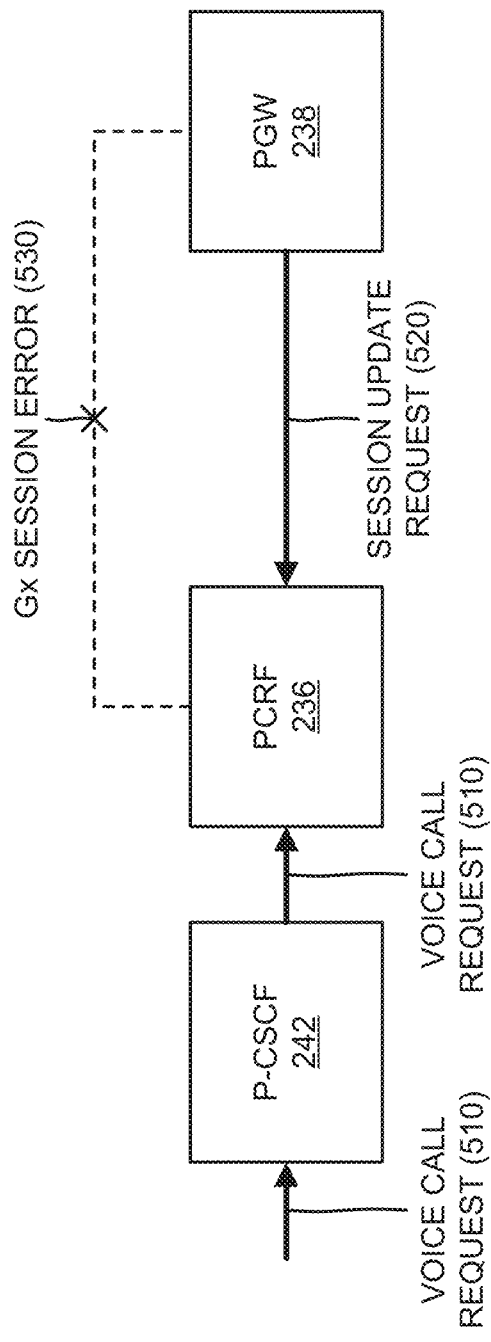

FIGS. 5A-5D are diagrams of an example 500 relating to example process 400 shown in FIG. 4. In example 500, assume that a first user (e.g., USER1) is associated with a first UE 210, as shown in FIG. 5A. Further, assume that the first user wishes to establish a voice call (e.g., a voice over LTE (voLTE) call) with a second user (e.g., USER2) associated with a second UE 210, via a network (e.g., LTE network 220, EPC network 230, and/or IMS network 240). The first user may utilize the first UE 210 to initiate the voice call, which may cause the first UE 210 to provide a voice call request 510 to the network, as further shown in FIG. 5A.

Voice call request 510 may be routed through the network and may eventually be received by P-CSCF 242 and provided to PCRF 236, as shown in FIG. 5B. In example 500, assume that a communication session (e.g., a Gx session) is established between PCRF 236 and PGW 238 prior to generation of voice call request 510. Further, assume that when voice call request 510 is generated, an event trigger, for the Gx session, is received by PGW 238. PGW 238 may generate a session update request 520 when the event trigger is received by PGW 238. Session update request 520 may request a status of the Gx session provided between PCRF 236 and PGW 238. As shown in FIG. 5B, PGW 238 may provide session update request 520 to PCRF 236, and PCRF 236 may receive session update request 520. PCRF 236 may attempt to identify the Gx session provided between PCRF 236 and PGW 238 based on session update request 520. In example 500, assume that PCRF 236 is unable to identify the Gx session with PGW 238 due to an error condition, as indicated by reference number 530 in FIG. 5B.

Figure 5C:
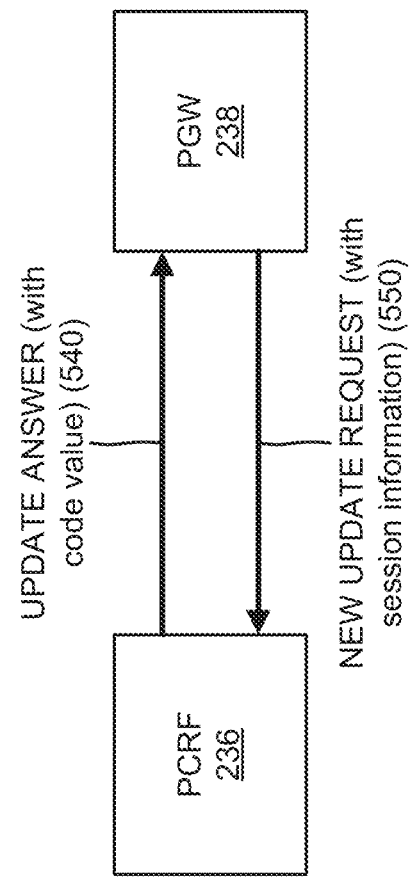

Since PCRF 236 is unable to identify the Gx session with PGW 238, PCRF 236 may generate an update answer 540 in response to session update request 520, as shown in FIG. 5C. Update answer 540 may provide a status of the Gx session provided between PCRF 236 and PGW 238, and may include a code value indicating that PCRF 236 wishes to recover the Gx session. As shown in FIG. 5C, PCRF 236 may provide update answer 540, with the code value, to PGW 238. PGW 238 may receive update answer 540, and the code value of update answer 540 may cause PGW 238 to identify available session information associated with the Gx session previously provided between PCRF 236 and PGW 238. The code value may also cause PGW 238 to generate a new update request 550 and to provide the identified session information in new update request 550. As shown in FIG. 5C, PGW 238 may provide new update request 550, with the session information, to PCRF 236, and PCRF 236 may receive new update request 550.

Figure 5D:
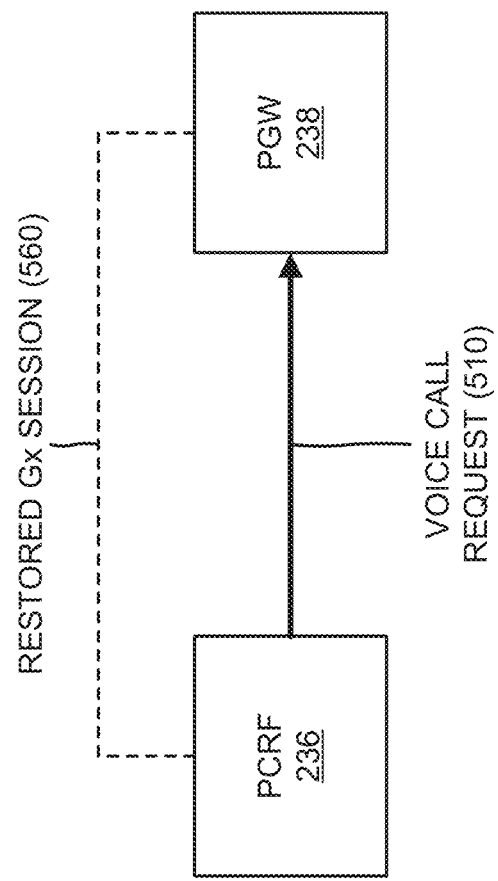

PCRF 236 may restore the Gx session between PCRF 236 and PGW 238 based on new update request 550 and the session information, as indicated by reference number 560 in FIG. 5D. After successfully restoring the Gx session with PGW 238, PCRF 236 may provide voice call request 510 to PGW 238 via the restored Gx session. PGW 238 may receive voice call request 510, and may process voice call request 510 so that the voice call may be established between the first user and the second user.

As indicated above, FIGS. 5A-5D are provided merely as an example. Other examples are possible and may differ from what was described with regard to FIGS. 5A-5D.

FIG. 6 is a flow chart of an example process 600 for providing an Rx-triggered recovery of a communication session provided between a PCRF and a PGW. In some implementations, one or more process blocks of FIG. 6 may be performed by PCRF 236 and/or P-CSCF 242. In some implementations, one or more process blocks of FIG. 6 may be performed by another device or a group of devices separate from or including PCRF 236 and/or P-CSCF 242.

As shown in FIG. 6, process 600 may include generating an authentication and authorization (AA) request, with a PGW address, based on a voice/video request (block 610). For example, UE 210 may attempt to establish a voice or video (voice/video) call with one or more other UEs via EPC network 230. When establishing the voice/video call. UE 210 may generate a request for the voice/video call. In some implementations, a communication session (e.g., a Gx session) may be established between PCRF 236 and PGW 238 prior to generation of the request for the voice/video call. In some implementations, P-CSCF 242 may receive the request for the voice/video call, and may generate an authentication and authorization (AA) request based on the request for the voice/video call. The AA request may include a media component description, an application identifier, bandwidth information, proxy information, an IP address of UE 210, a MSISDN of UE 210, etc.

In some implementations, P-CSCF 242 may provide an address of PGW 238 in the AA request. The address may include a PGW-fully qualified domain name (FQDN) associated with PGW 238. P-CSCF 242 may receive the PGW-FQDN from a serving-CSCF (S-CSCF) associated with EPC network 230, and the S-CSCF may receive the PGW-FQDN from a home subscriber server (HSS) during IMS network 240 registration. The HSS may receive the PGW-FQDN from MME 232 during IMS-PDN session establishment. In some implementations, P-CSCF 242 may provide the AA request, with the address of PGW 238, to PCRF 236.

As further shown in FIG. 6, process 600 may include receiving the AA request (block 620). For example, PCRF 236 may receive the AA request, with the address of PGW 238, from P-CSCF 242. In some implementations, PCRF 236 may attempt to identify a communication session (e.g., a Gx session) associated with PGW 238 based on the AA request and the address of PGW 238. For example, PCRF 236 may maintain or have access to a data structure (e.g., a table) that includes PGW addresses and identifiers for communication sessions associated with corresponding PGW addresses. PCRF 236 may compare the address of PGW 238 to the PGW addresses and the session identifiers contained in the data structure in order to identify a communication session associated with PGW 238. In some implementations, if the address of PGW 238 matches one of the PGW addresses and the communication session identifier matches a stored session identifier, PCRF 236 may identify the communication session associated with PGW 238.

As further shown in FIG. 6, process 600 may include failing to identify a Gx session with the PGW based on the AA request (block 630). For example, if the address of PGW 238 does not match one of the PGW addresses or if the session identifiers do not match, PCRF 236 may fail to identify the communication session associated with PGW 238. In some implementations, PCRF 236 may be unable to identify the communication session with PGW 238 due to an error condition or other problem (e.g., a software failure, geo-redundancy recovery, etc. associated with PCRF 236).

As further shown in FIG. 6, process 600 may include generating an AA answer based on the failure to identify the Gx session (block 640). For example, if PCRF 236 is fails to identify the communication session with PGW 238, PCRF 236 may generate an AA answer in response to the AA request. In some implementations, the AA answer may include a status (e.g., lost state) of the communication session provided between PCRF 236 and PGW 238. In some implementations, PCRF 236 may provide the AA answer to P-CSCF 242.

As further shown in FIG. 6, process 600 may include receiving the AA answer (block 650). For example, P-CSCF 242 may receive the AA answer from PCRF 236. In some implementations, PCRF 236 may attempt to restore the lost communication session with PGW 238 before providing another AA request to PCRF 236. In some implementations, P-CSCF 242 may provide another AA request for another UE 210, with the address of PGW 238, to PCRF 236 while PCRF 236 is restoring the lost communication session with PGW 238 for UE 210.

As further shown in FIG. 6, process 600 may include providing a reauthorization request to the PGW at the PGW address (block 660). For example, if PCRF 236 is fails to identify the communication session with PGW 238, PCRF 236 may attempt to restore the lost communication session by establishing a Gx restoration communication session with PGW 238. In some implementations, PCRF 236 may attempt to restore the lost communication session at the same time or around the same time that the AA answer is provided to P-CSCF 242. In some implementations, the restoration communication session may be identified with particular message content (e.g., AVPs, etc.). For example, PCRF 236 may generate a reauthorization request in an attempt to restore the lost communication session with PGW 238. In some implementations, the reauthorization request may include information (e.g., an IP address of UE 210, a MSISDN of UE 210, etc.) provided in the AA request. PCRF 236 may provide the reauthorization request to PGW 238 based on the address of PGW 238 (e.g., the PGW-FQDN) provided in the AA request. The reauthorization request may be provided to PGW 238, via the Gx restoration session that was previously established by PCRF 236 and PGW 238 at startup, and solely for the purpose of session restoration.

As further shown in FIG. 6, process 600 may include receiving an update request, with session information, from the PGW (block 670). For example, PGW 238 may receive the reauthorization request, and may determine that PCRF 236 wishes to restore the communication session based on the reauthorization request. Based on this determination, PGW 238 may identify available session information associated with the communication session previously provided between PCRF 236 and PGW 238. In some implementations, the session information may include entire policy control and charging rules, rules status, an APN-AMBR, a QoS, event triggers, binding information, etc. associated with the communication session.

PGW 238 may generate a communication session update request when the reauthorization request is received by PGW 238. In some implementations, PGW 238 may provide the identified available session information (e.g., the entire policy control and charging rules, the rules status, the APN-AMBR, the QoS, the event triggers, binding information, etc.) in the update request. In some implementations, PGW 238 may provide the update request, with the session information, to PCRF 236. PCRF 236 may receive the update request, with the session information, from PGW 238.

As further shown in FIG. 6, process 600 may include restoring a Gx communication session based on the update request and the session information (block 680). For example, PCRF 236 may restore the communication session between PCRF 236 and PGW 238 based on the update request and the session information. In some implementations, PCRF 236 may restore the communication session by utilizing the binding information to locate the communication session and to reestablish the communication with PGW 238. In some implementations, PCRF 236 may maintain a timer for the communication session restoration. In such implementations, if the communication session is not restored before the timer expires, PCRF 236 may generate an error message (e.g., a resource allocation failure message), which may result in a failure of the voice/video call. PCRF 236 may provide the error message to PC-CSCF 242. However, even if the voice/video call fails due to the timer expiration, a subsequent voice/video call may be successful since the communication session restoration may continue and may be successful prior to the subsequent voice/video call.

As further shown in FIG. 6, process 600 may include providing the voice/video request to the PGW via the restored Gx communication session (block 690). For example, if PCRF 236 successfully restores the communication session with PGW 238 (e.g., prior to the timer expiration), PCRF 236 may provide the request for the voice/video call to PGW 238 via the restored communication session. In some implementations, PCRF 236 may process the AA request received by P-CSCF 242, and may create policy and charging control architecture (PCC) rules for the voice/video call via interaction with PGW 238. In some implementations, PGW 238 may receive the request for the voice/video call, and may process the voice/video call per typical call-flow procedures.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7C:
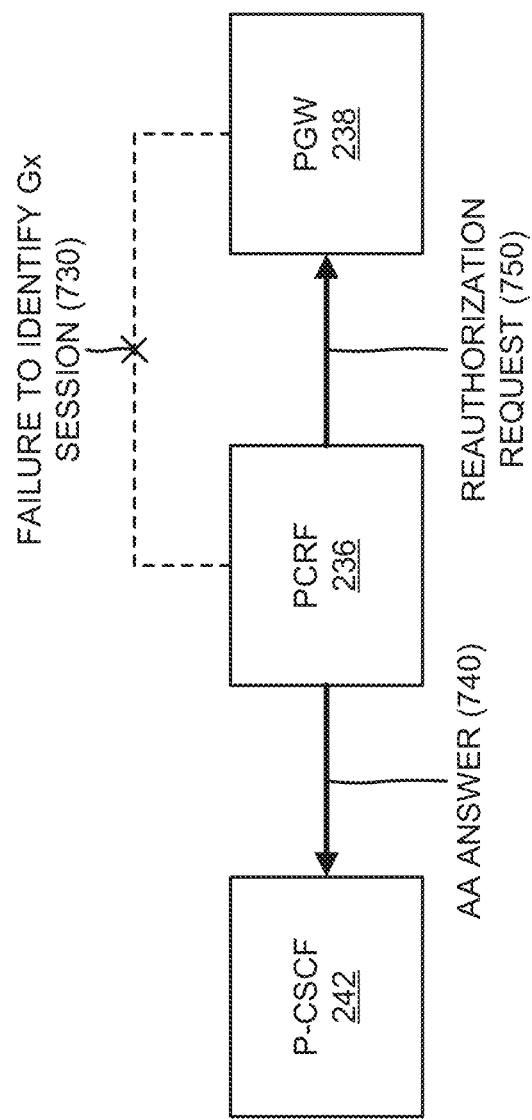

FIGS. 7A-7D are diagrams of an example 700 relating to example process 600 shown in FIG. 6. In example 700, assume that a first user (e.g., USER1) is associated with a first UE 210, as shown in FIG. 7A. Further, assume that the first user wishes to establish a video call with a second user (e.g., USER2) associated with a second UE 210, via a network (e.g., LTE network 220, EPC network 230, and/or IMS network 240). The first user may utilize the first UE 210 to initiate the video call, which may cause the first UE 210 to provide a video call request 710 to the network, as further shown in FIG. 7A.

Video call request 710 may be routed through the network and may eventually be received by P-CSCF 242, as shown in FIG. 7B. P-CSCF 242 may provide video call request 710 to PCRF 236, as further shown in FIG. 7B. In example 700, assume that a communication session (e.g., a Gx session) is established between PCRF 236 and PGW 238 prior to generation of video call request 710. Further, assume that when video call request 710 is generated, P-CSCF 242 generates an authentication and authorization (AA) request 720. AA request 720 may include a media component description, an application identifier, bandwidth information, proxy information, an IP address of the first UE 210, a MSISDN of the first UE 210, etc. AA request 720 may further include an address of PGW 238. As further shown in FIG. 7B, P-CSCF 242 may provide AA request 720, with the address of PGW 238, to PCRF 236, and PCRF 236 may receive AA request 720.

PCRF 236 may attempt to identify the Gx session provided between PCRF 236 and PGW 238 based on AA request 720. In example 700, assume that PCRF 236 is unable to identify the Gx session with PGW 238 due to an error condition, as indicated by reference number 730 in FIG. 7C. Since PCRF 236 is unable to identify the Gx session with PGW 238, PCRF 236 may generate an AA answer 740 in response to AA request 720. AA answer 740 may include a status (e.g., lost state) of the Gx session provided between PCRF 236 and PGW 238. As further shown in FIG. 7C, PCRF 236 may provide AA answer 740 to P-CSCF 242, and P-CSCF 242 may receive AA answer 740. PCRF 236 may also generate a reauthorization request 750 in an attempt to restore the lost communication session with PGW 238. Reauthorization request 750 may include information (e.g., an IP address or a MSISDN of the first UE 210, etc.) provided in AA request 730. As shown in FIG. 7C, PCRF 236 may provide reauthorization request 750 to PGW 238 based on the address of PGW 238 (e.g., provided in AA request 720).

Figure 7D:
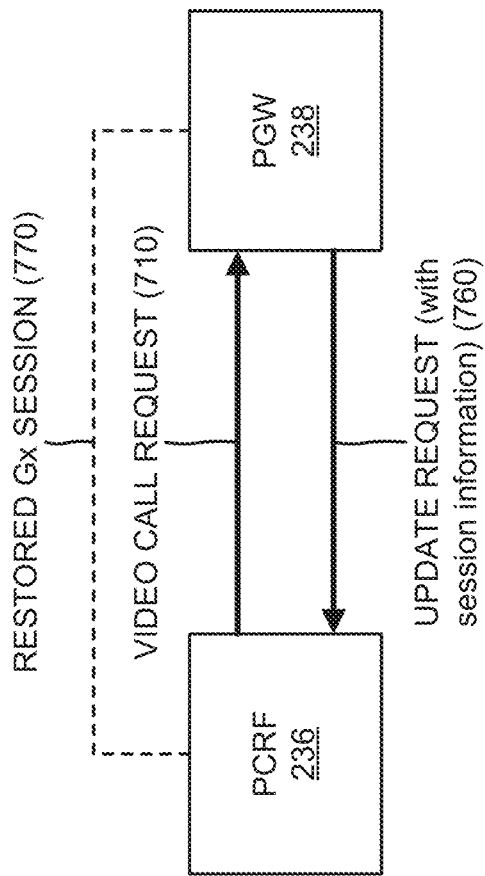

PGW 238 may receive reauthorization request 750, and may identify available session information, associated with the Gx session provided between PCRF 236 and PGW 238, based on reauthorization request 750. Reauthorization request 750 may cause PGW 238 to generate an update request 760 and to provide the identified available session information in update request 760, as shown in FIG. 7D. PGW 238 may provide update request 760, with the session information, to PCRF 236, and PCRF 236 may receive update request 760.

PCRF 236 may restore the Gx session between PCRF 236 and PGW 238 based on update request 760 and the session information, as indicated by reference number 770 in FIG. 7D. After successfully restoring the Gx session with PGW 238, PCRF 236 may provide video call request 710 to PGW 238 via the restored Gx session. PGW 238 may receive video call request 710, and may process video call request 710 so that the video call may be established between the first user and the second user.

As indicated above, FIGS. 7A-7D are provided merely as an example. Other examples are possible and may differ from what was described with regard to FIGS. 7A-7D.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
    receiving, by a first device associated with an evolved packet core network, a first update request from a second device associated with the evolved packet core network,
        the first update request being associated with a communication session previously provided between the first device and the second device,
        the first update request being generated based on a voice request or a video request,
        the first device including a policy and charging rule function (PCRF),
        the second device including a packet data network gateway (PGW), and
        the communication session including a Gx communication session;
    generating, by the first device, an update answer based on being unable to identify the communication session associated with the first update request,
        the update answer including a code requesting that the communication session be restored between the first device and the second device;
    receiving, by the first device and based on the code, a second update request from the second device,
        the second update request including session information associated with the communication session previously provided between the first device and the second device,
        the session information including binding information that indicates a plurality of internet protocol (IP) addresses; and
    restoring, by the first device and based on the session information, the communication session between the first device and the second device to create a restored communication session,
        restoring the communication session including locating the communication session based on the binding information.

2. The method of claim 1, further comprising:
    providing the voice request or the video request to the second device via the restored communication session.

3. The method of claim 1, further comprising:
determining whether a particular time period has elapsed between receipt of the first update request and the restoring of the communication session;
generating an error message when the communication session is not restored before the particular time period has elapsed; and
outputting the error message.

4. The method of claim 1, where the session information includes at least one of an entire charging rule or a rule status.

5. The method of claim 1, where the first update request includes a current control request update (CCR-U) message.

6. A first device associated with an evolved packet core network, the first device comprising:
one or more processors to:
receive a first update request from a second device associated with the evolved packet core network,
the first update request being associated with a communication session previously provided between the first device and the second device,
the communication session being unknown to the first device,
the first update request being generated based on a request for communication provided to the evolved packet core network,
the first device including a policy and charging rule function (PCRF),
the second device including a packet data network gateway (PGW), and
the communication session including a Gx communication session,
generate an update answer based on being unable to identify the communication session associated with to the first update request,
the update answer including a code requesting that the communication session be restored between the first device and the second device,
receive, based on the code, a second update request from the second device,
the second update request including session information associated with the communication session previously provided between the first device and the second device,
the session information including binding information that indicates a plurality of internet protocol (IP) addresses, and
restore, based on the session information, the communication session previously provided between the first device and the second device to establish a restored communication session,
when restoring the communication session, the one or more processors are to locate the communication session based on the binding information.

7. The first device of claim 6, where the one or more processors are further to:
provide the request for communication to the second device via the restored communication session.

8. The first device of claim 6, where the one or more processors are further to:
determine whether a particular time period has elapsed between receipt of the first update request and the restoring of the communication session,
generate an error message when the communication session is not restored before the particular time period has elapsed, and
output the error message.

9. The first device of claim 6, where the session information includes at least one of an entire charging rule or a rule status.

10. The first device of claim 6, where the first update request includes a current control request update (CCR-U) message.

11. A method, comprising:
receiving, by a first device associated with an evolved packet core network, an authentication/authorization request from a second device associated with an Internet protocol Multimedia Subsystem (IMS) network,
the authentication/authorization request being associated with a communication session previously provided between the first device and a third device associated with the evolved packet core network, and
the authentication/authorization request being generated based on a voice request or a video request,
the first device including a policy and charging rule function (PCRF),
the third device including a packet data network gateway (PGW), and
the communication session including a Gx communication session;
attempting, by the first device, to identify the communication session based on the authentication/authorization request;
providing, by the first device and to the second device, an authentication/authorization answer, in response to the authentication/authorization request, when the communication session is not identified;
providing, by the first device and when the communication session is not identified, a reauthorization request to the third device;
receiving, by the first device and based on the reauthorization request, an update request from the third device,
the update request including session information associated with the communication session previously provided between the first device and the third device,
the session information including binding information that indicates a plurality of internet protocol (IP) addresses; and
restoring, by the first device and based on the session information, the communication session previously provided between the first device and the third device to establish a restored communication session,
restoring the communication session including locating the communication session based on the binding information.

12. The method of claim 11, further comprising:
providing the voice request or the video request to the third device via the restored communication session.

13. The method of claim 11, where:
the second device includes a proxy call session control function (P-CSCF).

14. The method of claim 11, where the session information includes at least one of an entire charging rule or a rule status.

15. The method of claim 11, further comprising:
determining whether a particular time period has elapsed between receipt of the authentication/authorization request and the restoring of the communication session;
generating an error message when the communication session is not restored before the particular time period has elapsed; and
outputting the error message.

16. A first device associated with an evolved packet core network, the first device comprising:

one or more processors to:
- receive an authentication/authorization request from a second device associated with an Internet protocol Multimedia Subsystem (IMS) network,
  - the authentication/authorization request being associated with a communication session previously provided between the first device and a third device associated with the evolved packet core network,
  - the authentication/authorization request being generated based on a request for communication via the evolved packet core network,
  - the first device including a policy and charging rule function (PCRF),
  - the third device including a packet data network gateway (PGW), and
  - the communication session including a Gx communication session,
- attempt to identify the communication session based on the authentication/authorization request,
- provide, to the second device, an authentication/authorization answer, in response to the authentication/authorization request, when the communication session is not identified,
- provide, when the communication session is not identified, a reauthorization request to the third device,
- receive, based on the reauthorization request, an update request from the third device,
  - the update request including session information associated with the communication session previously provided between the first device and the third device,
  - the session information including binding information that indicates a plurality of internet protocol (IP) addresses, and
- restore, based on the session information, the communication session previously provided between the first device and the third device to establish a restored communication session,
  - when restoring the communication session, the one or more processors are to locate the communication session based on the binding information.

17. The first device of claim 16, where the one or more processors are further to:
provide the request for communication to the third device via the restored communication session.

18. The first device of claim 16, where:
the second device includes a proxy call session control function (P-CSCF).

19. The first device of claim 16, where the session information includes at least one of an entire charging rule or a rule status.

20. The first device of claim 16, where the one or more processors are further to:
determine whether a particular time period has elapsed between receipt of the authentication/authorization request and the restoring of the communication session,
generate an error message when the communication session is not restored before the particular time period has elapsed, and
provide the error message to the second device.

\* \* \* \* \*